I. C. LITTLE AND E. E. CROOK.
AIRCRAFT.
APPLICATION FILED NOV. 25, 1919.

1,377,421.

Patented May 10, 1921.
3 SHEETS—SHEET 1.

I. C. LITTLE AND E. E. CROOK.
AIRCRAFT.
APPLICATION FILED NOV. 25, 1919.

1,377,421.

Patented May 10, 1921.
3 SHEETS—SHEET 2.

I. C. LITTLE AND E. E. CROOK.
AIRCRAFT.
APPLICATION FILED NOV. 25, 1919.

1,377,421.

Patented May 10, 1921.
3 SHEETS—SHEET 3.

UNITED STATES PATENT OFFICE.

IVO CECIL LITTLE, OF BARROW-IN-FURNESS, AND EDWIN EDWARD CROOK, OF GREAT YARMOUTH, ENGLAND.

AIRCRAFT.

1,377,421.  Specification of Letters Patent.  Patented May 10, 1921.

Application filed November 25, 1919. Serial No. 340,459.

*To all whom it may concern:*

Be it known that we, Ivo CECIL LITTLE and EDWIN EDWARD CROOK, both subjects of the King of Great Britain, residing, respectively, at His Majesty's airship station, Barrow-in-Furness, in the county of Lancashire, England, and R. A. F. station, Great Yarmouth, in the county of Norfolk, England, have invented certain new and useful Improvements in and Relating to Aircraft, of which the following is a specification.

This invention relates to means whereby one or more aeroplanes can be carried on airships, or other lighter than air aircraft, in a manner so that they may be readily released, with or without a crew, from the airship while in the air.

The invention also relates to means whereby an aeroplane on land or water can be picked up by another airship while in the air and be securely attached to the airship so that the airship can proceed on its flight with it, and may be readily released from the airship while in the air.

The invention further relates to means for securing one or more aeroplanes to an airship so as to be readily released when the airship is in the air and to serve while secured to the airship as a power-unit or power-units for the propulsion and maneuvering of the airship. Such aeroplane power-units will be specially useful when it is desired to take the airship to heights considerably above the normal static ceiling height, and if it is desired that the airship shall remain at such heights, an aeroplane can be released and brought to land safely by its pilot.

The invention makes it possible for an airship to carry one or more aeroplanes which can be used for the purpose of defense or offense against other airships or aeroplanes or for carrying out scouting or reconnaissance operations, or for carrying articles, such as mails or merchandise, or persons to places where it is not convenient for the airship to proceed, or which can serve as power units for the propulsion and maneuvering of the airship, or which can be used for any other purpose for which aeroplanes are suitable. Further, the invention makes it possible for an airship to pick up such aeroplanes after they have carried out their operations, or to pick up other aeroplanes with their occupants when this is necessary for any reason.

The means according to the invention are such that an aeroplane is suspended from the airship at a single point while being held securely from moving relatively to the airship, and comprise a device for giving one point suspension of the aeroplane from the airship, a structure below the airship, rigidly fixed to or forming a component part of the airship, which is of such form that, when the aeroplane is drawn firmly against it, it prevents the aeroplane from moving relatively to the airship, and a device for drawing the aeroplane against the structure. The means according to our invention may also include a device for adjusting the attitude of the aeroplane relatively to the airship so that the aeroplane when used as a power-unit can serve both for the propulsion and maneuvering of the airship.

The invention will now be described with reference to the accompanying drawing, which shows one manner of carrying it into effect, and of which Figure 1 is a front view of the aeroplane suspended from the keel of a rigid airship, only rigid structural members of the airship being shown, Fig. 2 is a side view corresponding to Fig. 1, Fig. 3 is a plan view corresponding to Fig. 1 seen from above the aeroplane, and Fig. 4 is an enlargement of part of Fig. 2.

Figure 1:
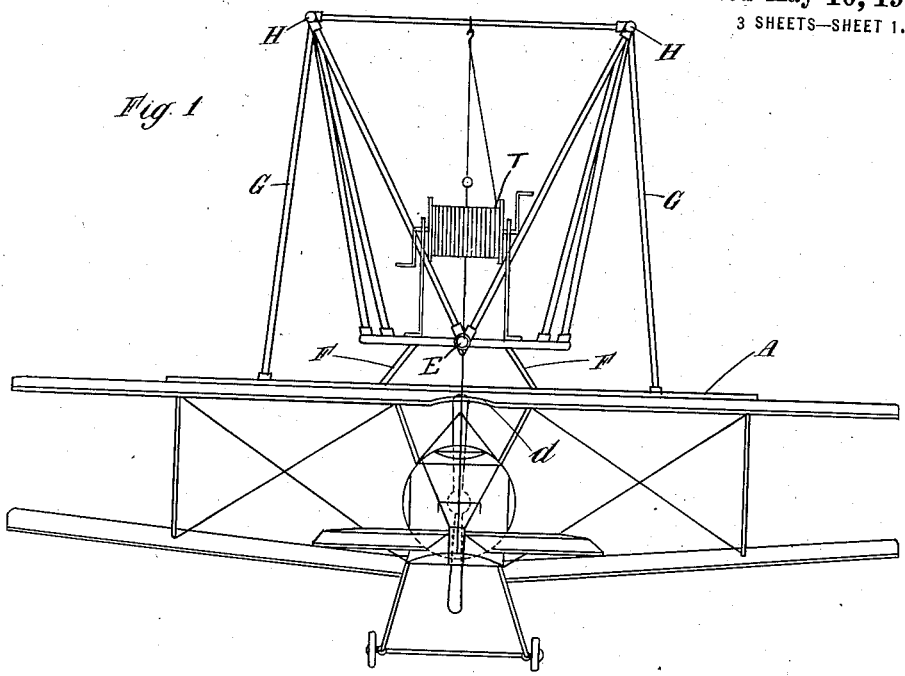

Referring to the drawing, the body of the aeroplane is provided with four lugs or the like fixed to suitable parts of its structure near the center of gravity of the aeroplane, and the lugs are connected by cables or the like *a* to a ring *b* which is secured through a quick-release device C or otherwise to the airship. The lugs may be at the sides of the body of the aeroplane, two in front and two at the rear of the center of gravity. The lengths of the cables or the like are such that when they are all taut the ring is situated in or near an aperture *d* provided in the center section of the upper wings of the aeroplane.

The airship is provided with two substantially parallel spars which are rigidly secured beneath it. The spars are so formed that, when the ring is properly secured to the airship, the upper wings of the aeroplane bear snugly against the whole length of the spars and the aeroplane is securely held from making any movement relatively to the airship.

In the arrangement shown in the drawing the spars are inclosed in the structure A.

Means such as a bottle-screw or turnbuckle B are provided between the ring $b$ and the part of the airship from which the aeroplane is suspended whereby the aeroplane after being got approximately into position may be drawn up and held against the spars. The turnbuckle is attached directly or through a strop D of wire cable to some rigid part of the airship, such as the keel E in the case of a rigid airship.

Figure 4:
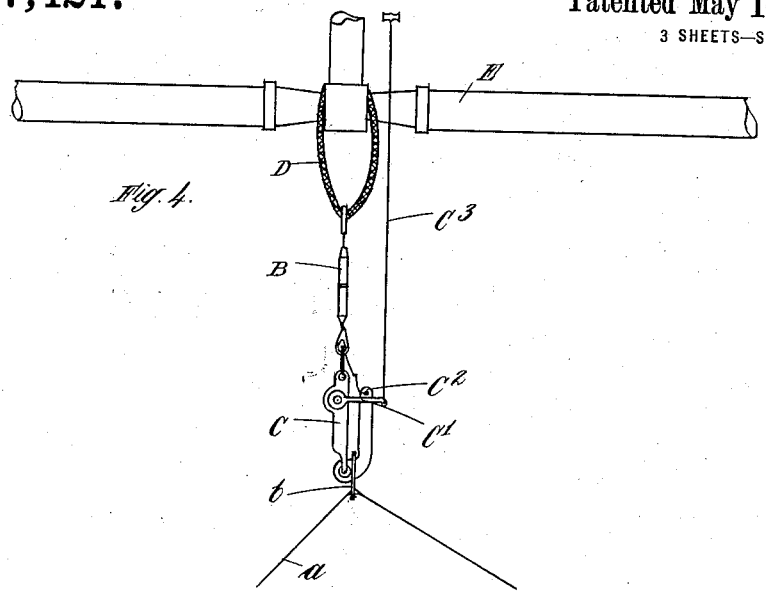
Figure 3:
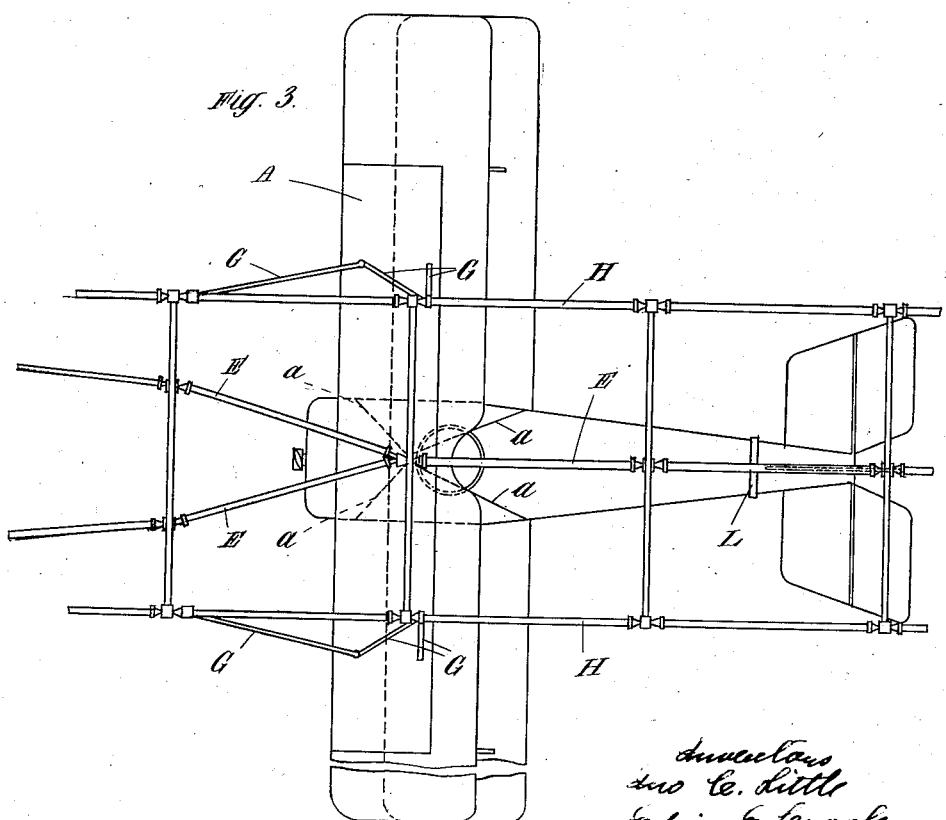

When a quick-release device C is used this may connect the ring $b$ with the turnbuckle or like device B. A suitable form of quick-release is what is known as the Blake slip. This is shown in Fig. 4 and consists of a hook, the hook part of which is hinged to the main part or shank and held when supporting a load by a link C' pivoted to the top of the shank and engaging over the lip or outer end of the hook. When the link is drawn upward, the lip of the hook is released and the hook is drawn outward and downward by the load so as to release the load. A safety-pin $C^2$ can be passed through the lip of the hook above the link, so that the link cannot be raised accidentally. When this device is used, the link, after removal of the safety-pin, may be drawn upward either by the pilot of the aeroplane or by some person in the airship, as for example by a wire $C^3$, when it is desired to release the aeroplane. It is preferred to provide two wires which can be operated one by the pilot and the other by a person in the airship. The pilot's wire will pass over a pulley so that the pilot can pull the link upward. It is to be understood that any other suitable means for operating the quick-release device may be employed, and that any other suitable form of quick-release device may be used.

In all cases, the spars are shaped so that they lie snugly against the upper wings of the aeroplane whether these have a dihedral angle or not. The spars and their connection to the airship may be made adjustable to allow of their use with aeroplanes of different dihedrals. The spars may be padded where they bear against the wings of the aeroplane. The positions of the spars relative one to the other are such that the aeroplane is held in the desired attitude. For example, the aeroplane may be held in the attitude which it generally has at the instant of commencing flight from the ground, or in the attitude in which the angle of incidence of the wings is suitable for obtaining the maximum support from the air when the airship is in flight, or in the attitude in which the air resistance to the aeroplane is a minimum.

The spars may be connected to the airship so that they may be adjusted relatively thereto for the purpose of varying the attitude of the aeroplane. Suitable mechanism will then be provided for effecting the adjustment from the airship and for locking the spars in position after adjustment. This arrangement is specially useful when the aeroplane is primarily intended to serve as a power-unit.

Figure 2:
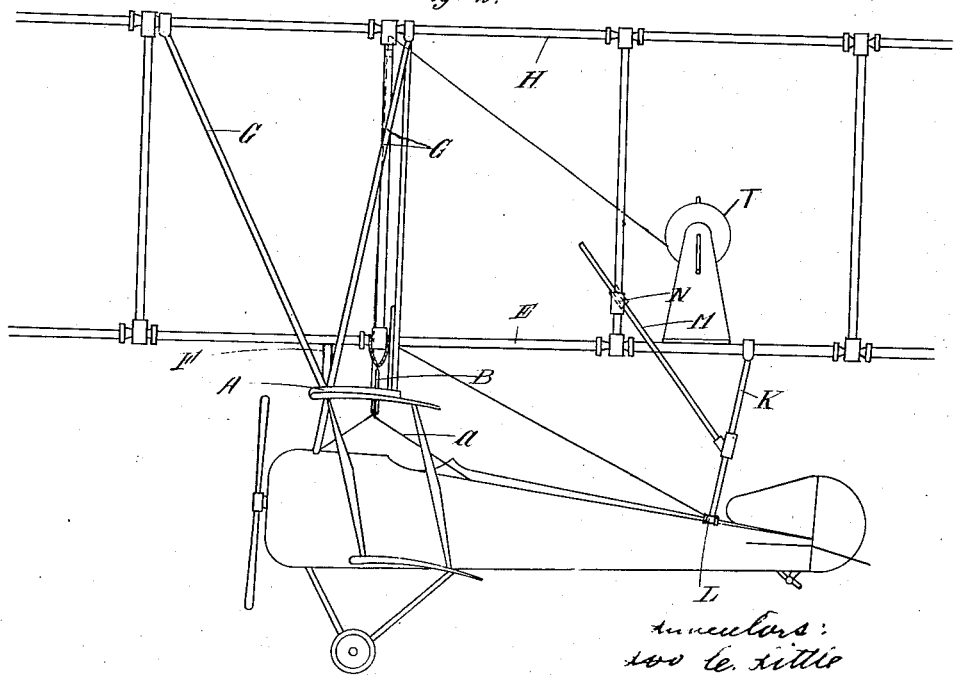
Figure 6:
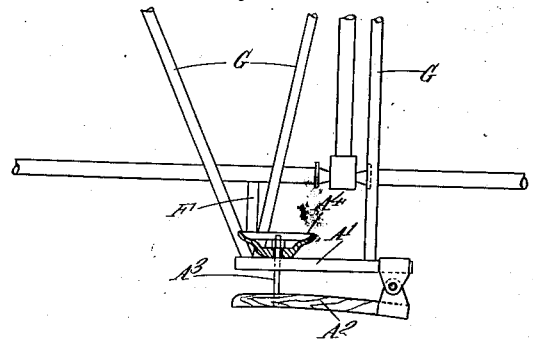
Fig. 6 shows a modification of the construction shown in Figs. 1 to 4.

One method by which the adjustment may be made is illustrated in Fig. 6, which is a view similar to Fig. 2, the structure A comprising two parts, one part A' being secured to the struts F, G, hereinbefore referred to, the other part $A^2$, against which the wings of the aeroplane bear being pivoted at the rear to the part A', and provided with two threaded rods $A^3$, spaced suitably apart transversely to the airship, which project through holes in the part A' and have threaded hand-wheels $A^4$ by means of which the part $A^2$ may be adjusted angularly in either direction during the flight of the airship.

The length of the spars may be suitably two-thirds of the span of the aeroplane, but a shorter or a greater length may be used so long as the aeroplane is firmly held. The spars will extend equal distances on each side of the ring attached to the aeroplane. They may be provided with a fairing or covering for reducing their air-resistance to a minimum. For example, they may be connected transversely by ribs so as to form a single structure A similar to the framework of an aeroplane wing, and the structure so formed covered on its upper surface or on both its upper and lower surfaces with a fabric, sheet-metal or other covering. Or the spars may be replaced by a sheet metal structure which is curved to lie snugly against the upper surface of the wings of the aeroplane.

These structures will be provided with an aperture to correspond with the aperture in the center section of the aeroplane.

The spars or other structure serving the same purpose may be rigidly held in position relative to the airship by struts. For example, when the airship has an external keel E, such as shown in the drawing, the spars may be connected near their center by short struts F to the keel E and between their center and their ends to longitudinal members H of the framework of the airship by long struts G. In the arrangement shown in the drawing, the aeroplane is suspended from an external keel at the point where it divides into two branches to form the floor of a cabin. The struts will be so arranged as to hold the spars securely against transverse and fore-and-aft movements. The spars or equivalent structure will thus be held a short distance below the keel. In the case of an airship with an internal keel, the spars will be held by struts against, or a short distance below the bottom of the airship, or the spars may form an integral portion of the structure of the ship, or the structure of the bottom of the ship may be modified so that a recess with rigid walls corresponding in form to the central part of the upper wings of the aeroplane is formed, and the aeroplane when in position may be suspended from the internal keel of the airship.

Figure 7:
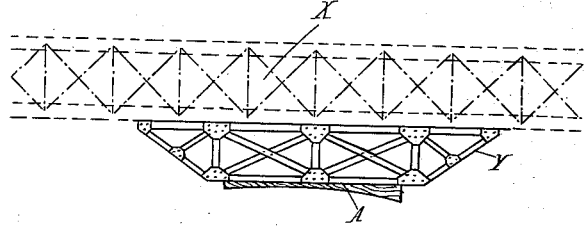
Fig. 7 illustrates a method of applying the invention to a rigid airship having an internal keel.

One method of applying the invention to a rigid airship with an internal keel is illustrated in Fig. 7, which is a side view of part of one of the lowermost longitudinal members X of the framework of the ship each of which has a frame Y secured thereto, and a diagrammatic cross-section of the structure A. The structure A is secured to the two frames Y, and the aeroplane is suspended from the internal keel in the manner hereinbefore described, this keel being some distance above the longitudinal members X. The frames Y will be suitably faired so as to reduce their air-resistance.

Additional means for preventing movement of the aeroplane relatively to the airship may be provided. These may consist of a member K pivoted to the airship at some distance behind the point of suspension of the aeroplane and terminating in a padded fork or yoke L which is adapted to bear against the top and sides of the fuselage of the aeroplane near its tail. The member K will be provided with means, such as a pivoted rod M passing through a bracket N provided in the airship, for bringing it to bear properly against the fuselage. The bracket will be provided with a clasp so that the rod and the member can be rigidly fixed in position. The clamp may be loosened and the member drawn up by means of the rod before the release of the aeroplane. A wire passing to a point in the airship near the point of suspension may also be provided for drawing up the member.

Figure 5:
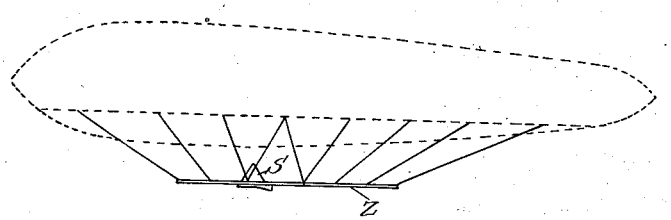
Fig. 5 illustrates diagrammatically a method of applying the invention to non-rigid airships.

In the case of non-rigid airships, the spars or an equivalent structure may be secured to or form part of a structure suitably suspended below the envelop, and means provided for gaining access to the aeroplane, when suspended, from a car or gondola of the airship. Fig. 5 shows a method of applying the spars or structure A to a small non-rigid ship, by means of a horizontal frame Z similar in plan form to, and suspended in the same way as the ordinary cars of small non-rigid airships. The frame carries a support S from which the aeroplane is suspended in the manner hereinbefore described. In this case, the aeroplane is the sole power unit of the airship, the envelop of which is lost when the aeroplane is released. As a modification of this method the spars or equivalent structure A may be secured to the bottom of a car of a non-rigid airship provided with one or more engines and propellers.

In the case of rigid airships, a winch T may be provided, at any suitable part, the hauling cable of which passes vertically through the central aperture in the structure comprising the spars. The end of the cable can be made fast to the ring on the aeroplane when on land or water and the aeroplane be hauled to position below the spars. The winch may be provided with a stop, so that, when the hauling is arrested by the stop, it is only necessary to attach and adjust the quick-release device and turnbuckle hereinbefore referred to in order properly to secure the aeroplane.

Instead of using the turnbuckle, the quick-release device attached to the ring may be rotatably secured to a threaded spindle which engages in a threaded socket or the like forming part of or secured to the keel of the airship, and gearing may be provided for turning the spindle so as to draw the aeroplane attached to the quick-release device up against the spars.

The aeroplane may be put in position for securing it to the airship by a winch as above described, or may be hauled up through any other gear by the screw of the airship. When the airship is near the ground the aeroplane can be put in position by a crane, provision being made by means of a removable panel or door in the outer envelop of the airship for allowing the end of the arm of the crane to be situated above the center of the spars. The said panel or door will also serve for enabling the crew of the aeroplane to pass from the aeroplane to the airship or vice versa, for the transfer of mails or other articles between the airship and the aeroplane, and for the adjustment and inspection of the means of suspension. The aeroplane can also be put in position by a winch, the hauling cable of which passes over a suitable pulley on the airship. Or the airship can be pulled down to proper position relative to the aeroplane by a winch or otherwise.

The hereinbefore described manners of carrying the invention into effect do not entail any modification of the design of existing airships, but it is obvious that an airship may be designed to take full advantage of this invention.

When the aeroplane is suspended by means of cables attached to a ring, as hereinbefore described, the ring may be prevented from springing back and striking the pilot at the moment of release by being attached to the center-section of the aeroplane by means of one or more strong wires. Further, the cables may be provided with quick-release devices, so that the pilot can readily detach them if they hinder his control of the aeroplane.

In the case of aeroplanes which are not of a form for which the transverse spars or like structure hereinbefore described is suitable, the spars or like structure can be modified so as to bear firmly against some part of the aeroplane to prevent it from moving relatively to the airship. For example, in the case of a monoplane, the spars can be curved either to bear transversely on the top of the fuselage in suitable position, or they may be formed to bear longitudinally on the fuselage. It is to be understood that various modifications of the hereinbefore described methods of carrying the invention into effect may be made without departing from the spirit of the invention.

What we claim and desire to secure by Letters Patent of the United States is:—

1. For securing an aeroplane to an airship or other lighter-than-air craft, means for providing one-point suspension of the aeroplane from the aircraft, means for preventing the aeroplane moving relatively to the aircraft while suspended therefrom.

2. For securing an aeroplane to an airship or other lighter-than-air craft, means for providing one-point suspension of the aeroplane from the aircraft, means for preventing the aeroplane moving relatively to the aircraft while suspended therefrom and means for raising the aeroplane from the ground or water to the airship.

3. For securing an aeroplane to an airship or other lighter-than-air craft, a device for giving one-point suspension of the aeroplane from the aircraft, a structure rigidly fixed below the aircraft and a device for drawing the aeroplane against said structure.

4. For securing an aeroplane to an airship or other lighter-than-air craft, a device for giving one-point suspension of the aeroplane from the aircraft, a structure below and forming a component part of the aircraft and a device for drawing the aeroplane against the structure.

5. For securing an aeroplane to an airship or other lighter-than-air craft, means for giving one-point suspension of the aeroplane from the aircraft including a quick-release device by which the aeroplane can be released from the aircraft, a structure rigidly fixed below the aircraft and adapted to contact with the aeroplane and a device for drawing the aeroplane against the structure.

6. Means for securing an aeroplane to an airship or other lighter-than-air craft, comprising a device for giving one-point suspension of the aeroplane from the aircraft, a structure below the aircraft of such form that it is adapted to permit of the aeroplane being secured against movement relatively to the aircraft, a fork or yoke pivotally attached to the airship adapted to bear against the fuselage of the aeroplane near the tail thereof, and a device for drawing the aeroplane against the structure.

7. Means for securing an aeroplane to an airship or other lighter-than-air craft, comprising a device for giving one-point suspension of the aeroplane from the aircraft, a structure fixed to the aircraft, a device for drawing the aeroplane against the structure and means for adjusting the attitude of the aeroplane relatively to the airship, so that the aeroplane can serve as a power-unit both for the propulsion and maneuvering of the airship.

8. Means for securing an aeroplane to an airship or other lighter-than-air craft, comprising a device for giving one-point suspension of the aeroplane from the aircraft, a structure fixed to the aircraft, a device for drawing the aeroplane against the structure, a device for adjusting the attitude of the aeroplane relatively to the airship so that the aeroplane can serve as a power-unit both for the propulsion and maneuvering of the airship and means for raising the aeroplane from the ground or water to the airship.

IVO CECIL LITTLE.
EDWIN EDWARD CROOK.